Figure 1:
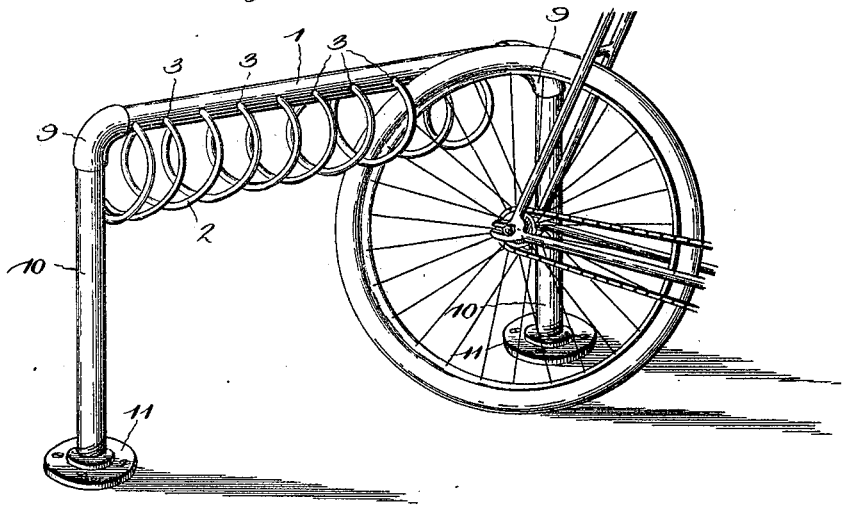

No. 623,967. Patented May 2, 1899.
E. S. BARNETT.
BICYCLE RACK.
(Application filed June 4, 1898.)
(No Model.)

Witnesses

Everard S. Barnett, Inventor.
By his Attorneys,

UNITED STATES PATENT OFFICE.

EVERARD S. BARNETT, OF WASHINGTON COURT-HOUSE, OHIO, ASSIGNOR OF ONE-HALF TO E. D. BEATTY, OF SAME PLACE.

BICYCLE-RACK.

SPECIFICATION forming part of Letters Patent No. 623,967, dated May 2, 1899.

Application filed June 4, 1898. Serial No. 682,547. (No model.)

*To all whom it may concern:*

Be it known that I, EVERARD S. BARNETT, a citizen of the United States, residing at Washington Court-House, in the county of Fayette and State of Ohio, have invented a new and useful Bicycle-Rack, of which the following is a specification.

This invention relates to bicycle holders or supports which may be placed upon the wall of a building, post, or other support for the convenience of bicycle-riders or for displaying machines in stores and the like.

The object of the present invention is to provide a simple and improved device of this character composed of a bar or rod properly supported, having a continuous series of spring-coils secured thereto, the coils being spaced apart a suitable distance. This and other objects and advantages of a device constructed in accordance with my invention will be hereinafter more fully described, shown in the drawings, and particularly pointed out in the claims.

Figure 2:
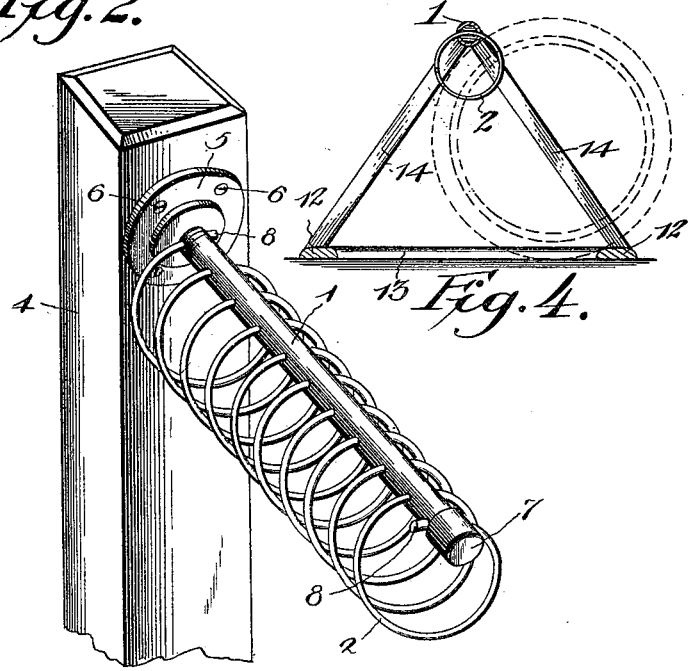
Figure 3:
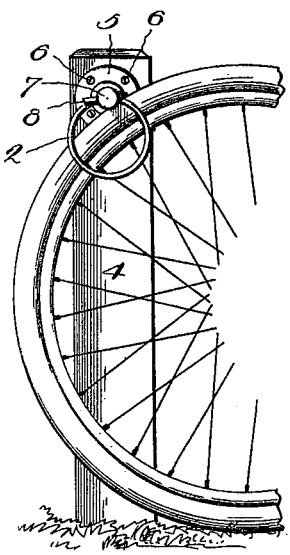

In the drawings, Figure 1 is a perspective view of my device used as a display-rack, showing a bicycle supported therein. Fig. 2 is a perspective view of the device supported upon a post. Fig. 3 is an end view thereof, showing a wheel supported thereby. Fig. 4 is a transverse sectional view showing my invention applied to a portable frame.

Corresponding parts in the several figures are denoted by like characters of reference.

Referring to the drawings, 1 designates a bar or rod, preferably an iron or metallic pipe, of suitable size and length, having a continuous cylindrical coil of heavy spring-wire 2, passing through the pipe from side to side through holes 3 provided therethrough, and extending the entire length of the pipe. Each coil is spaced apart from the next coil thereto a sufficient distance to allow the tire of a bicycle to be placed between the coils and be firmly held therein. The rod 1 is to be placed about twenty-six inches, or a little less than the diameter of the wheel, from the ground or floor, and the coils must be disposed beneath the rod, so that when the wheel is placed between the coils they will embrace the tire at each side and the rod will act as a stop to prevent the wheel from being pushed too far under the rod, as shown in Fig. 3, and therefore hold the wheel at the rear of the perpendicular axis thereof, which is the best position for supporting a bicycle in a substantial manner. By disposing the spring longitudinally, with its individual coils transversely of the rod, they extend equally upon both sides thereof, thus permitting bicycles to be supported upon both sides of the rod.

The rear wheel of the bicycle is preferably placed between the coils of my device, as it is steadier than the front wheel, and by reason of the tire of the wheel resting against the rod affords a convenient place to lock the bicycle by placing a chain around the rod and the rim of the wheel.

In Fig. 2 I have shown my invention in its simplest form, supported upon a post 4 by means of a cap in the form of a base-plate 5, fastened to the post by screws or nails 6 and having the rod screwed or otherwise connected therewith. The outer end of the rod is provided with a screw-cap 7, which is forced up against the protruding end 8 of the coil 2 and securely holds the same upon the rod. The base-plate 5 screws upon the rod 1 and secures the other end of the coil in a similar manner. Other means for securing the coiled wire may be used; but this is the simplest and preferred manner, and the cap 7 may be as ornamental as desired.

For use as a display-rack in stores and the like where a number of bicycles are to be supported I have illustrated my invention in Fig. 1, in which the rod 1 is provided at each end with a cap or end piece in the form of an elbow-joint 9, connecting with a standard 10, seated in a suitable base 11, which is secured to the floor in any desired manner. The elbow-joints 9 act in the same manner as the cap 7 and base-plate 5 to hold the coiled wire in place. In this manner of using my invention the rod or pipe 1 may be as long as desired, and by supporting the same at each end forms a substantial rack, which will hold a number of bicycles upon each side, thereby producing a convenient and useful display-rack.

To provide a portable rack, I have shown my invention applied as in Fig. 4, in which the rod 1, having the coils 2, is mounted upon a suitable frame. This frame comprises a base having side pieces 12, which are connected at each end by a transverse beam 13. The supporting-arms 14 are provided at each end of the frame and arranged in the form of an isosceles triangle, having the rod 1 supported at the apex thereof, thus being disposed above the center of the frame. The rod 1 should be arranged at a height as heretofore described, and when the wheel is placed in the rack the weight thereof on the side piece 12 prevents the rack from lifting or springing as the tire is forced between the coils 2. After the wheel has been placed in position it rests upon the ground or floor and against the inner edge of the side piece 12, as shown, which aids in preventing the wheel from accidentally slipping and rolling out of the rack. This arrangement permits of wheels being supported upon both sides of the rack, and therefore presents an attractive and useful portable bicycle-rack.

In using the term "cap" or "end piece" I design to cover the screw-cap 7, the base-plate 5, the elbow-joints 9, and any other suitable cap or end piece for engaging the ends of the coil to hold the latter upon the rod.

My invention presents a simple and inexpensive device which will prove highly useful and durable in a practical application, and as various changes in its form, proportion, and minor details may be made without departing from the spirit and scope or sacrificing any of the advantages thereof I therefore do not wish to be understood as limiting myself to the precise construction as herein described, and shown in the drawings.

Having thus described the invention, what is claimed, and desired to be secured by Letters Patent, is—

1. In a bicycle-holder, the combination of a pipe or rod having a series of transverse openings formed therethrough, a series of spring-coils passing through the openings, the coils being disposed beneath and projecting at opposite sides of the rod or pipe, and a support for the rod or pipe to elevate it above the ground and adapt it to receive the upper portion of one of the wheels of a bicycle between a pair of the coils, substantially as shown and described.

2. In a bicycle-holder, the combination of a rod or pipe having a series of transverse openings, a continuous series of spring-coils extending from end to end of the rod and passing through the openings, the coils being disposed beneath and projecting at opposite sides of the rod, caps or end pieces fitted to the ends of the rod and pressing against the respective ends of the coil, one of the caps or end pieces being in the form of a base-piece, and a support to which the base-piece is applied, substantially as shown and described.

3. In a bicycle-holder, the combination of a rod or pipe, having a series of transverse openings, a continuous series of spring-coils extending from end to end of the rod and passing through the openings, the coils being disposed beneath and projecting at each side of the rod, end pieces or caps fitted upon the ends of the rod and pressing against the respective ends of the coil, and a support for the rod, substantially as shown and described.

In testimony that I claim the foregoing as my own I have hereto affixed my signature in the presence of two witnesses.

EVERARD S. BARNETT.

Witnesses:
S. A. IRELAND,
W. H. DIAL.